US009707650B2

(12) United States Patent
Tiefenbock (10) Patent No.: US 9,707,650 B2
(45) Date of Patent: Jul. 18, 2017

(54) SYSTEM AND METHOD FOR MACHINING A WORKPIECE

(71) Applicant: EV GROUP E. THALLNER GMBH, St. Florian am Inn (AT)

(72) Inventor: Herbert Tiefenbock, Andorf (AT)

(73) Assignee: EV GROUP E. THALLNER GMBH, St. Florian am Inn (AT)

( * ) Notice: Subject to any disclaimer, the term of this patent is extended or adjusted under 35 U.S.C. 154(b) by 0 days.

(21) Appl. No.: 15/022,709

(22) PCT Filed: Aug. 26, 2014

(86) PCT No.: PCT/EP2014/068035
§ 371 (c)(1),
(2) Date: Mar. 17, 2016

(87) PCT Pub. No.: WO2015/043852
PCT Pub. Date: Apr. 2, 2015

(65) Prior Publication Data
US 2016/0221135 A1    Aug. 4, 2016

(30) Foreign Application Priority Data

Sep. 27, 2013  (DE) .......................... 10 2013 110 728

(51) Int. Cl.
*B23Q 1/34*        (2006.01)
*B23B 51/00*      (2006.01)
*B23C 5/16*        (2006.01)

(52) U.S. Cl.
CPC ............... *B23Q 1/34* (2013.01); *B23B 51/00* (2013.01); *B23C 5/16* (2013.01); *B23B 2226/31* (2013.01);
(Continued)

(58) Field of Classification Search
CPC ... B23C 5/18; B23C 2210/03; B23C 2220/48; B23C 2222/28; B23C 2270/10;
(Continued)

(56) References Cited

U.S. PATENT DOCUMENTS 3,972,161 A * 8/1976 Zoiss .................... B24B 33/086
                                                                407/119
4,789,277 A * 12/1988 Rhodes ................. B23B 27/148
                                                                407/119
(Continued)

FOREIGN PATENT DOCUMENTS

DE    20 2008 017 120 U1    4/2009    ............. B23B 27/12
EP          2 202 334 A1    6/2010    ............... B23C 5/10
(Continued)

OTHER PUBLICATIONS

International Search Report from corresponding International Patent Application No. PCT/EP2014/068035, dated Oct. 24, 2014.

*Primary Examiner* — Daniel Howell
*Assistant Examiner* — Yasir Diab
(74) *Attorney, Agent, or Firm* — Kusner & Jaffe (57) ABSTRACT

A workpiece accommodation device for purposes of accommodating a workpiece and for use in a device for the machining of a workpiece with: a tool mounting for purposes of accommodating the tool, a workpiece accommodation device for purposes of accommodating the workpiece, characterized in that during the machining process at least one first oscillation component can be introduced in a Z-direction, and an, in particular simultaneous, second oscillation component can be introduced in an X- and/or Y-direction by means of oscillation components.

17 Claims, 3 Drawing Sheets

(52) U.S. Cl.
CPC ....... *B23B 2228/56* (2013.01); *B23C 2210/03* (2013.01); *B23C 2222/28* (2013.01); *B23C 2226/31* (2013.01); *B23C 2270/10* (2013.01); *Y10T 409/305488* (2015.01); *Y10T 409/307448* (2015.01)

(58) Field of Classification Search
CPC ............ B23C 2226/31; B23C 2226/18; B23C 2226/12; B23C 2226/125; B23C 2226/315; B23Q 1/34; B24B 1/04; Y10T 409/303752; Y10T 409/303808; Y10T 409/305488; Y10T 409/307448
See application file for complete search history.

(56) References Cited

U.S. PATENT DOCUMENTS

| | | | | |
|---|---|---|---|---|
| 4,863,490 | A * | 9/1989 | Buljan | ...................... B24D 3/00 51/293 |
| 5,078,031 | A * | 1/1992 | Buljan | .............. C04B 35/58071 407/119 |
| 5,165,205 | A * | 11/1992 | Nakagawa | ................ B23Q 1/34 366/108 |
| 5,993,300 | A | 11/1999 | Hashimoto | .................... 451/165 |
| 2007/0052326 | A1* | 3/2007 | Liu | ........................ B23B 29/125 310/323.18 |
| 2008/0128170 | A1* | 6/2008 | Drivdahl | ................. E21B 10/48 175/58 |
| 2008/0318501 | A1* | 12/2008 | Sanuki | .................... B23B 37/00 451/366 |
| 2013/0259592 | A1* | 10/2013 | Tiefenbock | ............. B23P 25/00 409/132 |
| 2014/0093322 | A1 | 4/2014 | Bleicher et al. | ............. 409/131 |
| 2014/0231149 | A1* | 8/2014 | Drivdahl | ................. E21B 10/48 175/405.1 |

FOREIGN PATENT DOCUMENTS

| | | | | |
|---|---|---|---|---|
| JP | 2001-121313 A | 5/2001 | ............ B23B 27/14 |
| JP | 2002-283122 A | 10/2002 | ............... B23C 5/10 |
| WO | WO 2012/084779 A1 | 6/2012 | ............... B06B 1/06 |
| WO | WO 2012/167288 A1 | 12/2012 | ............... B24B 1/04 |

* cited by examiner

SYSTEM AND METHOD FOR MACHINING A WORKPIECE

FIELD OF INVENTION

The present invention concerns a system for machining a workpiece, and a corresponding method.

BACKGROUND OF INVENTION

At the present day semi-finished products can be machined using various production technologies in a short period of time with very tight tolerances. The progress in the chip-forming and chip-less machining of workpieces can primarily be attributed to the rapid progress made in tool technology and machine tool technology. A machine tool is understood to be a machine that accommodates the tool and guides the latter relative to a workpiece. The tool is the component that is directly positioned against the workpiece that is being machined, in order to machine the latter. A multiplicity of different tools exist for various machine tools, for example, drill bits, milling cutters, grinding wheels, wires, chisels, thread cutters, etc.

The application of these tools ensues predominantly from their area of deployment. This will be illustrated with the aid of two simple examples.

Drill bits are, for example, tools that execute a rotational movement about their cylindrical axis (tool axis), while they are driven into the material with a feed rate parallel to the axis of rotation (feed direction). As the result of the combination of rotation and feed a tool-specific transport of material ensues. With their cutting edge spiral drill bits generate a chip that is transported by the spiral cutting edge to the surface. The feed movement thereby drives the drill bit ever deeper into the workpiece, while the cutting edge generates a chip in the drilled hole. Here the feed direction is identical with the tool axis.

Milling cutter tools are also rotating tools, usually operating at high frequency, for purposes of chip-forming machining. Depending upon the type of milling cutter, however, a workpiece can be machined by a milling cutter along more than one axis. In the same way as drill bits, milling cutters possess tool-specific parameters, the knowledge of which is indispensable for the rapid, efficient, cheap, and, above all, correct machining of a workpiece.

Grinding tools possess usually a plane surface, in particular, in the case of rotational movement, a circular surface. With the application of pressure they are moved onto the workpiece surface that is being machined, and remove the workpiece material correspondingly from the whole surface. Grinding pencils, in contrast, possess an abrasive sleeve surface, and thus have a curved tool surface.

In addition to the three types of tools that have been cited very many others also exist, all of which are manufactured for very particular machining conditions. Although the tools can be categorised with reference to their application, each type of tool in turn possesses various forms of embodiment. Thus, for example, roughing milling cutters exist for purposes of roughing out, that is to say, for the rough machining of workpieces, and finishing milling cutters exist for purposes of corresponding fine machining of the workpiece. Moreover, the same tools can be produced from different materials. It is obvious that workpieces of a particularly soft material should be machined with a tool that possesses a certain strength and hardness. In particular in the case of high-strength materials, such as carbide and nitride ceramics, it is ever more difficult to develop appropriate materials for the tools that are to be used for machining, since these must possess a very high hardness, strength and, above all, also toughness. The choice of the correct tool is therefore decisive for an efficient and correct machining of a workpiece.

SUMMARY OF INVENTION

It is therefore an object of the present invention to improve generic systems and methods such that lower tool wear and correspondingly higher service lives can be achieved, together with an increase of the machining speed, that is to say of the chip volume, or material removal volume, per unit of time.

This object is achieved with the features of the independent claim(s). Advantageous further developments of the invention are specified in the subordinate claims. All combinations of at least two of the features specified in the description, the claims, and/or the figures, fall within the framework of the invention. In the case of specified ranges of values, values located within the limits cited should also apply as limiting values and should be able to be claimed in any combination.

The invention concerns on the one hand a multiphase material and a corresponding tool that is comprised of the multiphase material, or has at least been coated with the latter. In particular the multiphase material takes the form of a two-phase material, that is to say, a material with precisely two phases. In a very particular form of embodiment the said two-phase material is a mechanical alloy. In the further course of the patent reference is made explicitly to such a two-phase material, although the inventive forms of embodiment can also be executed with multiphase materials.

In particular, the two-phase material is comprised at least of a matrix material and diamonds embedded in the latter. It is particularly suitable for the machining of high-strength, hard and ultra-hard materials. The tool is distinguished by high wear resistance, long service lives, high feed rates, etc. The inventive tool operates particularly effectively if an oscillating relative movement exists between the inventive tool and the workpiece that is being machined. In accordance with the invention, the tool has, on the other hand, a particularly high efficiency if it is used with a machine tool that can allow the component (workpiece) that is being machined to oscillate relative to the tool in an inclined plane, the normal vector of which is not parallel to the tool axis and/or to a feed direction of the tool.

The prior art discloses the importance, above all, of the correct choice of tool for the workpiece that is being machined in each case, together with the correct selection of the machining parameters. In contrast to the above, the invention concerns the construction and, above all, the correct use, of a micro- and/or nano-structure of the tool surface, which has a decisive influence on the machining of the workpieces. This is primarily because the surface of the tool represents the transfer surface between tool and workpiece, and thus has a decisive influence on the transfer of force and moment from the tool geometry onto the workpiece surface. An advantage of the invention includes the more efficient machining of workpieces, above all, in its inventive use on workpieces of high-strength, hard and ultra-hard materials. A plurality of different testing methods exist in the technology for determining the hardness grade of materials For ceramic and/or sintered materials the hardness measurement in accordance with Knoop is very often used. Here the materials that can preferably be machined in accordance with the invention preferably possess Knoop hardnesses higher than 1, preferably higher than 10, more preferably higher than 100, even more preferably higher than 1000, ideally higher than 5000. The Knoop hardness of approximately 4800 for cubic boron nitride (cBN) and the Knoop hardness of approximately 7000 for diamond can serve as comparative values.

Another hardness testing method is the Vickers method, which is very similar to the Knoop method. The hardness values cannot be transferred 1:1 between the Knoop and the Vickers methods, but move over the same order of magnitude, According to Vickers, diamond possesses a hardness of approx. 8000, cubic boron nitride of approx. 5000, boron carbide of approx. 3700, silicon carbide of approx. 3500, titanium boride of approx. 3450, aluminium oxide of approx. 2100, chromium carbide of approx. 2100, zirconium oxide of approx. 1200, chromium nitride of approx. 1100, and titanium carbide of approx. 2200. In comparison with the above, structural steel possesses a Vickers hardness of only approximately 100.

For the person skilled in the art, all hardness testing methods, their advantages and disadvantages, together with conversion tables and formulae, are of known art. The inventive method is preferably suitable for machining all the above-cited materials in an extremely short period of time (application).

In particular, the invention describes a surface of a tool, and a method for optimal deployment of the tool with the inventive surface for the machining of materials. The tool surface is preferably used for the purpose of breaking up the structure of hard and ultra-hard materials, for example, carbide and/or nitride materials. Inventive forms of embodiment and methods can also have a positive effect on tough materials, in particular metals. The inventive tools can be fitted with cooling grooves, running, in particular, predominantly in the longitudinal direction, and/or in the form of a spiral, so as to cool the surface efficiently.

In the context of the description of the invention no differentiation is made in principle between chip formation and the breaking up of a high-strength, low-toughness, structure. Accordingly, in what follows the term "chip", together with the inherent meaning of the word, that is to say, the chip of a material that can predominantly be deformed plastically, is to be understood to include also the grains that are broken out of a high-strength, low-toughness microstructure. In accordance with the invention the term "machining" includes machining with both geometrically determinate and geometrically indeterminate cutting edges, wherein its use for geometrically indeterminate cutting edges is preferred in accordance with the invention. For brittle materials the word "tearing chip" is very often used. In general a differentiation can be made between the following types of chips:
  tearing chip
  shearing chip
  flowing chip
  lamellar chip In accordance with the invention the machining of workpieces of a granular material with a grain size distribution is preferred.

The inventive tool surface is in particular a multiphase tool surface, which is comprised of at least two components, preferably a matrix material, and micro and/or nano fragments embedded in the matrix material, which in what follows are designated as micro- or nano-chisels, or simply just as chisels. The tool surface material is preferably a. composite material. In principle the inventive tool surface has a positive effect on the machining of the structure of a workpiece for any kind of tool. However, as an inventively preferred form of embodiment the inventive tool surface is particularly efficient on a cutting edge tool.

The tool can take the form, in particular, of one of the following forms of embodiment:
  cutting edge tool, in particular
    milling cutter, in particular
      cylindrical milling cutter,
      end face cylindrical milling cutter
      prismatic milling cutter,
      half-round profile milling cutter,
      disk milling cutter,
      angle milling cutter,
      shank end milling cutter,
      elongated hole milling cutter,
      slot milling cutter,
      groove milling cutter, or
      elongated hole milling cutter,
    drill hit, in particular
      thread-cutting tap,
      spiral drill bit, or
      stepped drill bit,
    lathe tools, in particular
      lathe chisel
    reamer,
    chisel, or
    saw,
  grinding tool,
  general tool parts, in particular
    indexable cutting insert For the matrix material one of the following material groups is preferably selected in accordance with the invention:
  alloys, in particular
    steel, in particular
      tool steel, in particular
        high-speed steel (HSS),
        hot-working steel, and/or
        cold-working steel
    carbides, and/or
    refractory metals, and/or
    metal matrix composite materials (MMC), and/or
    solders
  metals, in particular
    crystalline metals, and/or
    quasi-crystalline metals, and/or
    amorphous metals (metallic glasses),
  ceramics, and/or
  carbon fibre composite material.

In particular the micro-chisels are fixed in position with solder.

The chisels comprise in particular a material with a hardness (on the Mohs hardness scale) greater than 7, preferably greater than 8, and/or a hardness (Rockwell hardness) greater than 60, preferably greater than 63. Preferred hardness data in accordance with Vickers is more accurate. The Vickers hardness of the chisel is greater than 10, preferably greater than 100, more preferably greater than 1000, even more preferably greater than 5000, at best of equal magnitude as, or greater than, the Vickers hardness of diamond. The chisels are preferably comprised of one of the following materials or one of the following classes of material:
  minerals, in particular
    elemental forms, preferably
      diamond,
    alloys, in particular steel, in particular tool steel, in particular
  high-speed steel (HSS), and/or
  hot-working steel, and/or
  cold-working steel,
carbides, and/or
refractory metals, and/or
metal matrix composite materials MMC),
metals, in particular
  crystalline metals, and/or
  quasi-crystalline metals, and/or
  amorphous metals (metallic glasses),
ceramics, in particular SiC, $Si_3N_4$, and/or
glass, in particular quartz and/or
carbon fibre composite material.

In accordance with the invention the chisels preferably take the form of diamonds.

With the inventive form of embodiment all types of structures can be machined in principle. In particular, however, the inventive form of embodiment is suitable for high-strength materials with a micro- and/or nano-crystalline, brittle structure. A "micro- or nano-crystallline structure" is understood to mean a microstructure in which the individual crystallites, the so-called "grains", possess dimensions in the micro- or nano-meter range. In particular in the case of some ceramic materials, such as silicon carbide, the grains can possess an elongated, needle-shaped or plate-shaped morphology, In this case the primary axes of the grains are of different length, "Strength" is understood to mean the resistance with which a material Opposes plastic deformation. The inventive form of embodiment is primarily, but not exclusively, used for the machining of brittle materials. Brittle materials possess little or no tendency to deform in a plastic manner, and are primarily characterised by a so-called brittle fracture failure. For this reason data regarding yield points, yield strengths and tensile strengths are less meaningful for brittle materials. The stress at which an ideal brittle material fractures is designated as the breaking stress. Without entering into the exact differences between yield points, tensile strengths and breaking stresses in more detail, the inventive machining of materials with yield points or breaking stresses above 10 $N/mm^2$ is preferred, preferably above 100 $N/mm^2$, more preferably above 1000 $N/mm^2$, even more preferably above 5000 $N/mm^2$. The inventively preferred materials for machining are:
  metals, in particular
    refractory metals, and/or
    light metals, and/or
    carbides, and/or
    non-ferrous metals,
  metal alloys,
  ceramics, in particular
    $Si_3N_4$, h-BN, c-BN, w-BN, WC and/or $W_2C$ and/or
    minerals
  glasses, in particular
    metallic glasses, and/or
    ceramic glasses, in particular quartz
  polymers.

In particular the average size of the chisels inventive embedded in the matrix material is on average less than 1000 µm in cross-section, preferably less than 100 µm, more preferably less than 10 µm, even more preferably less than 1 µm.

A large part of the volume of the chisels is in particular embedded in the matrix material. Preferably more than 20%, preferably more than 40%, more preferably more than 60%, even more preferably more than 80% of the volume is embedded in the matrix material, that is to say, is surrounded by the matrix material.

The average space between the chisels is designated as the chip space, which primarily serves to accommodate the chip, or chip fragments, or fragments of hard and brittle materials. The average size of the chip space, that is say, in particular the average distance between adjacent chisels, in accordance with the invention is in particular set within the order of magnitude of the chips that are to be transported away, preferably +/−20% of the average size of the chips. Above all, in the case of nano- and/or microcrystalline materials, whole grains of the order of magnitude of the chip space can sometimes be broken out of the material. This is all the more true, the more brittle the material that is being machined.

In accordance with the invention the rapid removal of the generated chip from the chip space is also particularly desirable, in order to keep the loading on the tool, the tool surface and the machine tool to a minimum. Therefore, in a very much preferred form of embodiment, the chip is removed from the intermediate space between tool and workpiece at least as rapidly as it can be formed, or preferably more rapidly. The quantity of chip received per unit time, together with the size of the chip, depends on a plurality of parameters. Thus a tool with a high feed rate will rough-cut faster into the material than the chip can be transported out of the chip space. The chip is transported out of the chip space faster, the higher the cutting speed of the tool. Therefore, the cutting speed in accordance with the invention is in particular adjusted such that with a prescribed feed rate the chip can be transported away sufficiently quickly. In particular, the parameters are determined empirically.

In the ideal form of embodiment the inventive tool is used such that the chip, or chips, generated are on average less than 10 times smaller (measured in particular as the average diameter in each case, or as the longest diameter in each case), are preferably less than 5 times smaller, are more preferably less than 3 times smaller, than the average grain size of the grains of the material of the workpiece; particularly preferably they are as large as the average grain size.

The device is preferably adjusted such that whole grains can be broken out of the surface of the workpiece. Here the chip in question, or the chips generated, can on average be smaller than the average grain size. In particular the chip, or chips, generated on average are greater than 0.01, preferably greater than 0.1, more preferably greater than 0.5, even more preferably greater than 0.8, times the average grain size of the grains of the material of the workpiece. By virtue of the fact that many grains are formed in the shape of plates or needles, and/or can fundamentally differ in their sizes, an average grain diameter for the grain size is assumed, in accordance with the invention. Here the average grain size lies between 100 µm and 1 nm, preferably between 50 µm and 10 nm, more preferably between 10 µm and 0.1 µm, even more preferably between 10 and 1 µm. In accordance with the invention, the part of the chisel that projects out of the matrix material is designated as the utilisation part. The part of the chisel that is embedded and/or anchored in the matrix material is designated as the anchor part. When deployed in accordance with the invention, the utilisation part is a mechanical lever, which can penetrate into the structure of the workpiece and break out the grains.

The length of the utilisation part, that is to say, the average distance between the outermost point of the chisel and the tool surface, is designated as the average chisel exit length, or the average utilisation part length. In particular the average utilisation part length is less than 1 mm, preferably less than 100 µm, preferably less than 10 µm, more preferably less than 1 µm.

In particular, the average distance between the microchisels is less than 1 mm, preferably less than 100 µm, preferably less than 10 µm, more preferably less than 1 µm. In the ideal case up to 100% of the surface is populated with the microchisels, As a rule the tool radii are much larger than the average distance between the microchisels on the tool surface. In this manner a tool surface area of the size of the average distance between two microchisels can be viewed as flat, and the calculation of the chip space can be ascribed to the two parameters of the chisel exit length and the average distance between two microchisels. In particular, in accordance with the invention the chip space is greater than 100 $nm^3$, preferably greater than 1 $µm^3$, more preferably greater than 10 $µm^3$, even more preferably greater than 100 $µm^3$, ideally greater than 1 $mm^3$.

The "cutting speed" is understood to be the velocity of the chip-forming cutting edge in the cutting direction. The feed rate is the velocity with which the tool is driven further into the region of the workpiece that is being machined. Fundamentally, it is true to say that the feed rate can be increased if the cutting speed is increased, without generating additional forces on the chisels.

In accordance with the invention, the frequency of a movement period (for example, the rotation of a rotating milling cutter or drill bit, or the oscillating movement of the tool of a shaper), which is independent of any additional oscillation (process-controlled axis excitation, see further below) is in particular greater than 10 Hz, preferably greater than 50 Hz, more preferably greater than 100 Hz, even more preferably greater than 1000 Hz, ideally greater than 10,000 Hz.

From this frequency of the tool there ensues the cutting speed $v_c$. In particular, the cutting speed $v_c$ is greater than 10 m/min, preferably greater than 1000 m/min, more preferably greater than 2000 m/min, even more preferably greater than 3000 m/min, ideally greater than 5000 m/min.

In combination with the above-cited inventive aspects, further fundamental concept of the present invention includes achieving an improved machining action by process-controlled axis excitation. In accordance with the invention, during the engagement of the tool with the workpiece, that is to say, during the machining action, an oscillating inclined relative movement takes place between the workpiece holder, and thus the workpiece, and the tool. In particular the tool holder is comprised of at least two parts, which can be set in oscillation relative to one another along an inclined plane by means of oscillating agents. From this two oscillation components ensue, namely a first oscillation component in the feed direction of the tool, and a second oscillation component transverse to the feed direction. Together with the cutting direction, which in particular runs transverse to the first and/or the second oscillation component, the inventive "chisel effect" is achieved, which provides a significant acceleration of the machining process with the same application of forces. The system for generating this effect is disclosed in the document WO2012/084779A1, to which reference is made in this respect. The combination of a process-controlled axis excitation in conjunction with the inventive tool is one of the main aspects of the patent, and a clear differentiation from the prior art, in that the tools here cited can be deployed, but have a very high wear of the surface, in particular of the diamonds, after a very short tool service life, since the force action necessary for the breakup of the structure as a result of the process-controlled axis excitation is not present. Diamonds are, moreover, very heat-sensitive and vaporise very easily at high temperatures, particularly in an atmosphere containing oxygen. In particular, therefore, cooling of the tool, in particular of a diamond tool, is provided. The inventive tool can operate particularly efficiently if cooling is used that keeps the inventive tool at an operating temperature of less than 500° C., preferably less than 300° C., more preferably less than 100° C., even more preferably less than 50° C.

A better machining action is achieved if the oscillation frequency of the oscillation agents can be adjusted to be less than 1 GHz, in particular less than 100 MHz, preferably less than 1 MHz, more preferably less than 100 kHz, even more preferably less than 1 kHz, ideally between 100 Hz and 600 Hz. In that, simultaneously or independently, the oscillation amplitudes of the oscillation agents can be adjusted to be <100 µm, in particular <50 µm, preferably <10 µm, and ideally between 1 µm und 10 µm, the machining action of the device in accordance with one form of embodiment of the invention is further improved. Ideally the oscillation amplitude should always be chosen such that it is always less than the average utilisation length $L_N$ of the diamond.

The maximum oscillation amplitude of the first and/or the second oscillation component is preferably as large as the average utilisation length. The ratio between the oscillation amplitude of the first and/or the second oscillation component and the average utilisation length is less than 1, preferably less than $10^{-2}$, more preferably less than $10^{-4}$, even more preferably less than $10^{-6}$, most preferably less than $10^{-8}$, ideally less than $10^{-10}$.

In general there are two general operating states of the inventive tool that are very different from one another. The first, intended, and desired operating state takes the form of oscillating machining of the structure with the aid of the inventive tool, which calls upon the inventive chisel effect, in which machining takes place, at least predominantly, in the form of removal of whole grains of the material. The individual chips correspond therefore in particular to the size of the grains of the material of the workpiece.

The second, unintended operating state takes the form of a grinding down of the structure, that is to say, it is an operating state in which the oscillation of the inventive tool can no longer be maintained, is too strongly damped, or breaks down. In this state an efficient removal of the structure is not ensured. This is in particular the case if the feed rate is not large enough to bring about the inventive chisel effect, in which, in particular in conjunction with the inclined oscillation movement, chips are broken out of the material of the workpiece at least predominantly as whole grains.

In the upward direction, that is to say, if the inventive parameters for the feed rate are exceeded, the problem of overheating can exist, so that in accordance with the invention in particular a parameter corridor is provided, in which the cited chisel effect is brought about.

In accordance with the invention the tool is preferably adjusted such that the tool remains in the oscillating state.

The frequency of a movement period takes the form in particular of the rotational frequency of a milling cutter about its own axis. Above all in conjunction with the equipment of known art from WO2012/084779A1 the rotational frequency and the feed rate must stand in a ratio with one another such that the action of breaking up the structure does not translate into an action in which the structure is ground down. The process-controlled axis excitation of known art is added from the document WO2012/084779A1, which introduces an additional oscillation component into the system In accordance with the invention these parameters can also be selected in conjunction with all other parameters acting on the system such that at no point in time does the tool make the transition into a grinding process, but always oscillates relative to the structure with the described chisel effect. In particular the necessary parameters and the optimal sets of parameters are empirically determined, wherein a time measurement of the chip flow and/or a grain size distribution of the chip are preferably evaluated.

It is particularly advantageous if, in accordance with one form of embodiment of the invention, the oscillation agents have piezoelements for purposes of generating the oscillation.

Further advantages, features, and details of the invention ensue from the description of preferred examples of embodiment, together with the aid of the figures.

DETAILED DESCRIPTION OF THE INVENTION

Figure 1:
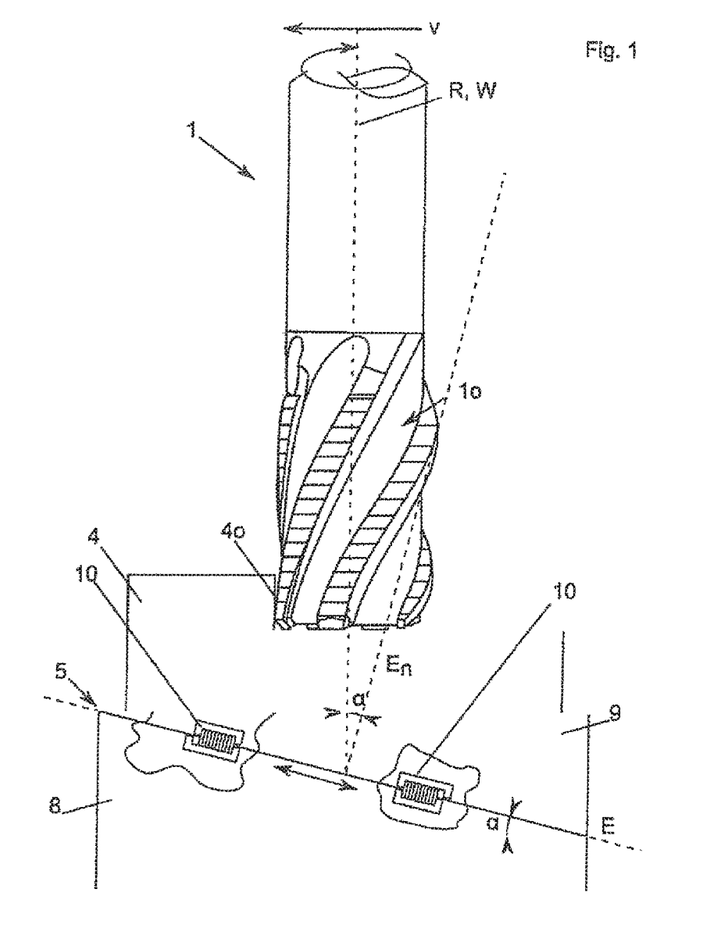
FIG. 1 shows a schematic representation of a form of embodiment of the inventive system.

FIG. 1 shows a schematically represented tool 1, not to scale, (here a roughing milling cutter) with a tool surface 1o. The tool experiences a feed in a feed direction v, and in the particular form of embodiment rotates about an axis of rotation R/tool longitudinal axis W. From the direction of rotation a cutting direction s ensues along a workpiece surface 4o of a workpiece 4 that is being machined.

The tool surface 1o of the tool 1 contacts the workpiece 4 on the workpiece surface 4o. The workpiece 4 is mounted/fixed on a workpiece holder 5. With regard to the workpiece holder 5 reference is made to WO2012/084779A1. The workpiece holder 5 is constructed such that it can allow the workpiece 4 to oscillate along a plane E; the vector En normal to the plane possesses an angle of inclination α to the tool longitudinal axis W, and/or is inclined relative to the feed direction v and/or the cutting direction s.

To this end the workpiece holder 5 is comprised of a first oscillation element 8 and a second oscillation element 9 guided relative to the first oscillation element 8 along the inclined plane E.

Oscillation agents, preferably in the form of piezoelements 10, are provided in order to execute a movement of the oscillation elements 8, 9 relative to one another.

The piezoelements 10 connect the two oscillation elements 8 and 9 with one another such that by means of a reciprocal electrical loading of a piezoelement 10, a relative movement takes place between the oscillation elements 8 and 9. By the electrical loading of the piezoelements 10 a high-frequency oscillating movement between the two oscillation elements 8 and 9 is possible. Needless to say, use of mechanical, pneumatic or hydraulic elements would also be conceivable; these would replace the piezoelements 10.

Figure 2A:
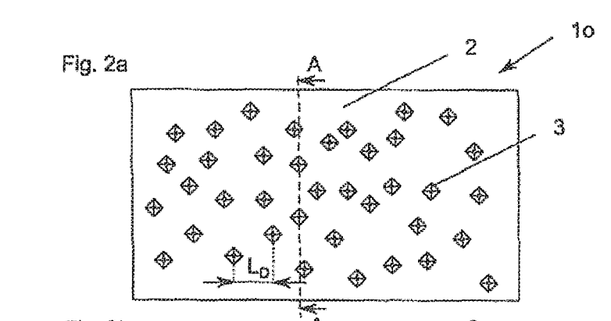
FIG. 2a shows a schematic plan view of a first inventive surface of a tool with a high density of microchisels.

FIG. 2a shows an enlarged detail of the tool surface 1o of the tool 1, comprised of a plurality of microchisels 3, here diamonds. The distance $L_D$ characterises the distance between two microchisels. Since the microchisels 3 in general are not homogeneously distributed in the matrix material 2, an average distance Lm is specified, which represents the (arithmetically) averaged distance between the microchisels 3.

Figure 2B:
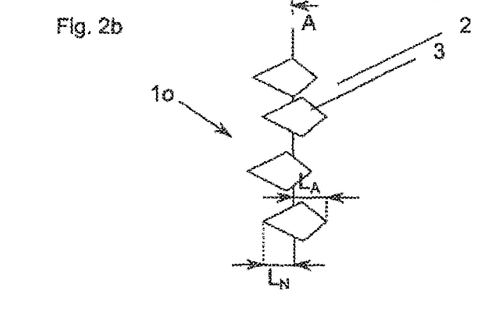
FIG. 2b shows a schematic side view of the surface along the line of cut A-A in FIG. 2a, FIG. 3a shows a schematic plan view of a second inventive surface of a tool with a low density of microchisels.

FIG. 2b shows a cross-section through the tool surface 1o along the line of cut A-A.

The tool surface 1o is comprised of a matrix material 2 and a multiplicity of chisels 3 embedded in the matrix material 2, The chisels 3 possess a utilisation part 3n projecting out of the tool surface 1o, and an anchor part 3a embedded in the matrix material 2. The average length of the utilisation part 3n is the utilisation length $L_N$, the average length of the anchored part is $L_A$.

Figure 3A:
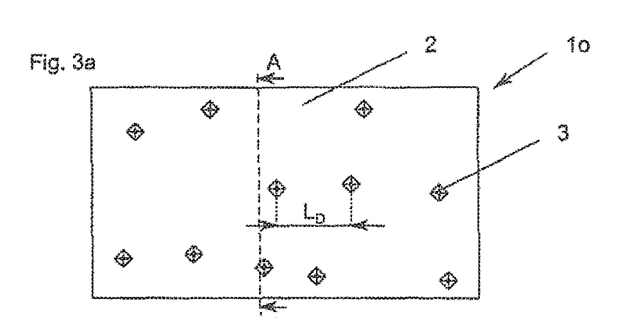
Figure 3B:
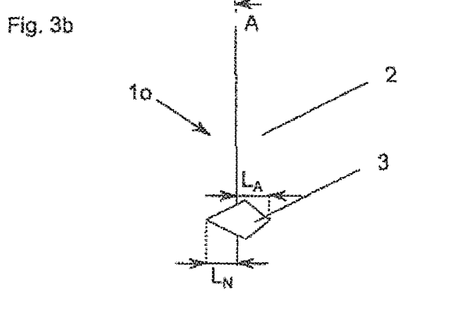
FIG. 3b shows a schematic side view of the surface along the line of cut B-B in FIG. 3a, FIG. 4 shows a schematic representation of an $Si_3N_4$-structure.

FIGS. 3a and 3b show analogous schematic representations of a corresponding tool surface 1o, but with a lower density/number of microchisels 3. The number of microchisels 3 per square millimeter is greater than 1, preferably greater than $10^1$, more preferably greater than $10^2$, even more preferably greater than $10^3$, most preferably greater than $10^4$, ideally greater than $10^6$.

Figure 4:
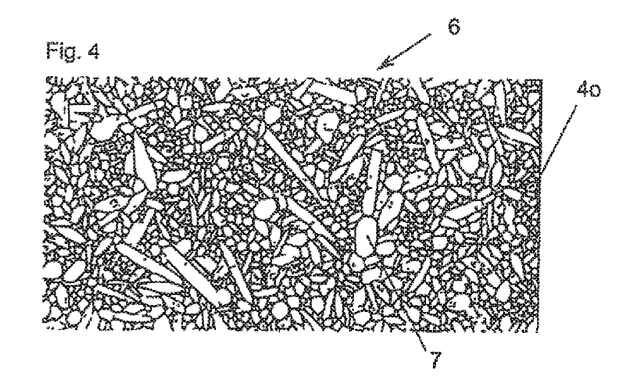

FIG. 4 shows a schematic structure 6 of a high strength material, here a ceramic. The schematic structure 6 preferably takes the form of a silicon nitride ($Si_3N_4$) structure. The structure 6 is in particular distinguished by grains 7 with an elongated, in particular a needle-shaped, constitution. The grains 7 perceived to be almost circular only appear to be globular. In actual fact these are the same elongated grains 7. In the view (ground section) the grains 7 are lying such that their longest axis is located approximately normal to the grinding plane.

Figure 5:
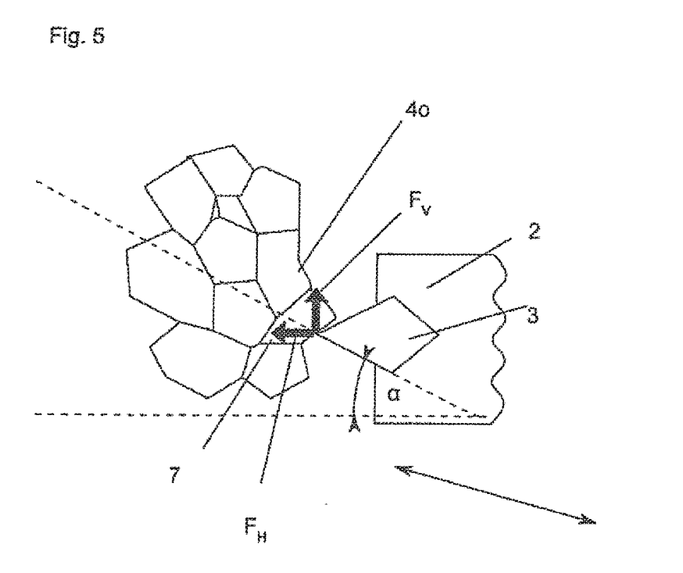
FIG. 5 shows a schematic, enlarged representation of the movement of an inventive chisel relative to the workplace.

FIG. 5 shows the inventive efficient machining of high-strength, hard, and ultra-hard structures 6. The inventive combination of a tool surface 1o with microchisels 3 projecting out of the matrix material 2, and the imposition of an inclined oscillation, leads to the fact that the workpiece surface 4o moves at a constant, and in particular a reproducible, angle α relative to the microchisels 3. Upon contact of the microchisel 3 with a grain 7 in the workpiece surface 4o, the grain 7 is subjected to a horizontal loading with a force component $F_H$ and a vertical loading with a force component $F_V$. Here the following inventive aspects are of inventive and decisive significance:

The movement of the workpiece holder 5, and with it the workpiece 4 along the plane E, is independent of, and/or transverse to the feed movement v and/or the cutting direction s, that is to say, the direction of rotation of the tool 1, and can be adjusted in any manner.

The oscillation along the plane E, upon contact of the microchisel 3 with a grain 7 of the structure 6 on the workpiece surface 4o, always leads to the formation of a horizontal and a vertical force component, in particular as a result of a relative movement of two oscillation elements along an inclined plane E, and The forces that thereby result are added to the tool forces of the moving tool 1, in particular to the cutting forces and/or the feed forces, The three points cited mean that the structure 6 experiences a loading that releases the grains 7 out of the structure 6 with extremely high efficiency.

While in the prior art the machining of a structure 6 as represented, in particular a ceramic structure, up to the present day has in general been possible, this has only been with very rapid wear of the tool, very long machining times and very low tolerances. As a result relatively high production costs occur. The inventive tool uses a surface with microchisels in order to bring about optimal chip formation. The inventive tool operates particularly efficiently in conjunction with the equipment from the document WO2012/084779A1. The most favourable machining of a workpiece with the inventive tool takes place if the workpiece is moved in an oscillatory manner along an inclined plane with the aid of the equipment from the document WO2012/084779A1.

An inventively essential aspect includes primarily in using the tool surface 1o with microchisels 3 so as to machine efficiently a workpiece surface 4o of a workpiece 4, which has been fixed on a workpiece holder 5.

Here, in particular, the oscillation of the workpiece 4 along the inclined plane E is utilised so as to subject the workpiece surface 4 to a horizontal and vertical force by means of the microchisels.

LIST OF REFERENCE SYMBOLS

1 Tool
1o Tool surface
2 Matrix material
3 Microchisels
3n Outer part of the embedded material
3a Inner part of the embedded material
4 Workpiece
4o Workpiece surface
5 Workpiece holder
6 Structure
7 Grain
8 First oscillation element
9 Second oscillation element
10 Piezoelement
v Feed direction
s Cutting direction
R Axis of rotation
W Tool longitudinal axis
E Plane of oscillation
En Normal to the plane of oscillation
α Angle of inclination
$L_N$ Utilisation length
$L_A$ Anchor length
$L_D$ Distance
Lm Average distance
$F_H$ Horizontal force action
$F_V$ Vertical force action

The invention claimed is:

1. A system for machining a workpiece surface of a workpiece, the system comprising:
    a tool having a tool surface for the machining of the workpiece surface in a feed direction v,
    a workpiece holder for accommodating the workpiece, wherein the workpiece is configured such that it can be set into oscillation by means of oscillation agents along a plane of oscillation E inclined to the feed direction v,
    wherein at least the tool surface is formed from at least two different materials, the tool surface including a first material and a second material that projects out of the first material with an average utilisation length, and
    wherein an oscillation amplitude of the oscillation agents is less than the average utilisation length.

2. The system in accordance with claim 1, wherein the first material of the tool surface is a matrix material and the second material of the tool surface is at least one chisel embedded in the matrix material.

3. The system in accordance with claim 2, wherein the matrix material is formed from one or more of the following materials:
    an alloy, a metal, a ceramic, and a carbon fibre composite material.

4. The system in accordance with claim 2, wherein the at least one chisel is formed from one or more of the following materials:
    a mineral, an alloy, and a metal.

5. The system in accordance with claim 2, wherein the average size of the at least one chisel is less than 1000 μm.

6. The system in accordance with claim 2, wherein more than 20% of the volume of the at least one chisel is embedded in the matrix material.

7. A method for the achining of a workpiece surface of a workpiece, the method comprising:
    machining the workpiece surface with a tool having a tool surface, formed from at least two different materials, the workpiece surface being machined in a feed direction v,
    oscillating a workpiece holder for accommodating the workpiece along a plane of oscillation E inclined to the feed direction v,
    wherein the tool surface comprises a first material and a second material that projects out of the first material with an average utilisation length, and
    wherein the workpiece holder is oscillated at an oscillation amplitude that is less than the average utilisation length.

8. The system in accordance with claim 3, wherein the alloy is selected from one or more of the following:
    a steel, a carbide, a refractory metal and/or a metal matrix composite materials (MMC).

9. The system in accordance with claim 8, wherein the steel s a tool steel.

10. The system in accordance with claim 9, wherein the tool steel is selected from one or more of the following:
    a high-speed steel (HSS), a hot-working steel, and/or a cold-working steel.

11. The system in accordance with claim 3, wherein the metal is selected from one or more of the following:
    a crystalline metal, a quasi-crystalline metal and/or an amorphous metal.

12. The system in accordance with claim 4, wherein the mineral is in elemental form.

13. The system in accordance with claim 12, wherein the elemental form is a diamond.

14. The system in accordance with claim 4, wherein the alloys are selected from one or more of the following:
    a steel, a carbide, a refractory metal, and/or a metal matrix composite material (MMC).

15. The system in accordance with claim 14, wherein the steel is a tool steel.

16. The system in accordance with claim 15, wherein the tool steel is selected from one or more of the following:
    a high-speed steel (HSS), a hot-working steel, and/or a cold-working steel.

17. The system in accordance with claim 4, wherein the metal is selected from one or more of the following:
    a crystalline metal, a quasi-crystalline metal and/or an amorphous metal.

* * * * *